United States Patent
Malkin et al.

(10) Patent No.: US 9,047,385 B1
(45) Date of Patent: Jun. 2, 2015

(54) INTERACTIVE BARCODES

(71) Applicant: Delago Technology Holdings, LLC, Chicago, IL (US)

(72) Inventors: Barry Malkin, Chicago, IL (US); Rajdeep Singh Gill, Delhi (IN)

(73) Assignee: Delago Technology Holdings, LLC, Chicago, IL (US)

( * ) Notice: Subject to any disclaimer, the term of this patent is extended or adjusted under 35 U.S.C. 154(b) by 70 days.

(21) Appl. No.: 14/046,545

(22) Filed: Oct. 4, 2013

Related U.S. Application Data

(60) Provisional application No. 61/709,451, filed on Oct. 4, 2012.

(51) Int. Cl.
| | |
|---|---|
| G06F 17/00 | (2006.01) |
| G06K 7/00 | (2006.01) |
| G06K 7/10 | (2006.01) |
| G06K 7/14 | (2006.01) |
| G06F 17/30 | (2006.01) |

(52) U.S. Cl.
CPC ................ *G06F 17/30879* (2013.01)

(58) Field of Classification Search
CPC ... G06Q 30/02; G06Q 10/10; G06F 17/30879
USPC .......................... 235/375, 435, 454
See application file for complete search history.

(56) References Cited

U.S. PATENT DOCUMENTS

| | | | |
|---|---|---|---|
| 7,849,411 B1 * | 12/2010 | George et al. ............... | 715/758 |
| 2009/0112683 A1 * | 4/2009 | Hamilton et al. ............. | 705/10 |
| 2013/0014151 A1 * | 1/2013 | Tallapaneni et al. ........... | 725/23 |

* cited by examiner

*Primary Examiner* — Michael G Lee
*Assistant Examiner* — Laura Gudorf
(74) *Attorney, Agent, or Firm* — Lowenstein Sandler LLP

(57) ABSTRACT

A centralized barcode system is described. The centralized barcode system includes a barcode generation system configured to create a customized barcode by creating a new barcode or enhancing an existing barcode.

20 Claims, 8 Drawing Sheets

INTERACTIVE BARCODES

RELATED APPLICATIONS

This application claims the benefit of U.S. Provisional Application No. 61/709,451, filed Oct. 4, 2012, the entire contents of which are incorporated herein by reference.

FIELD OF INVENTION

The present disclosure relates to identification systems and methods, and more particularly, to interactive barcodes.

BACKGROUND

Codes, such as barcodes, are used in a variety of industrial applications and increasingly by consumers. Codes are a daily part of life for companies to track products effectively across supply chains or distribute product specific information. A change has taken place in the market whereby consumers are beginning to more widely adopt the usage of codes, in particular two-dimensional (2-D) codes, because the proliferation of mobile devices. Scanners downloaded to mobile devices, particularly smart phones, can provide a user with the ability decipher codes quickly and efficiently. The code provides instant access to information by linking the physical world with the digital world.

Today, codes are used to re-direct users to uniform resource locators (URLs) or store modest amounts of information such as emails, mobile numbers, and profile identifiers (IDs). The browser supports uniform resource identifier (URI) redirection, which allows 2-D codes to send metadata to existing applications on a device.

While codes are becoming more prolific, the chances that a consumer will engage with a website at the time of scanning is still limited.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

Figure 1:
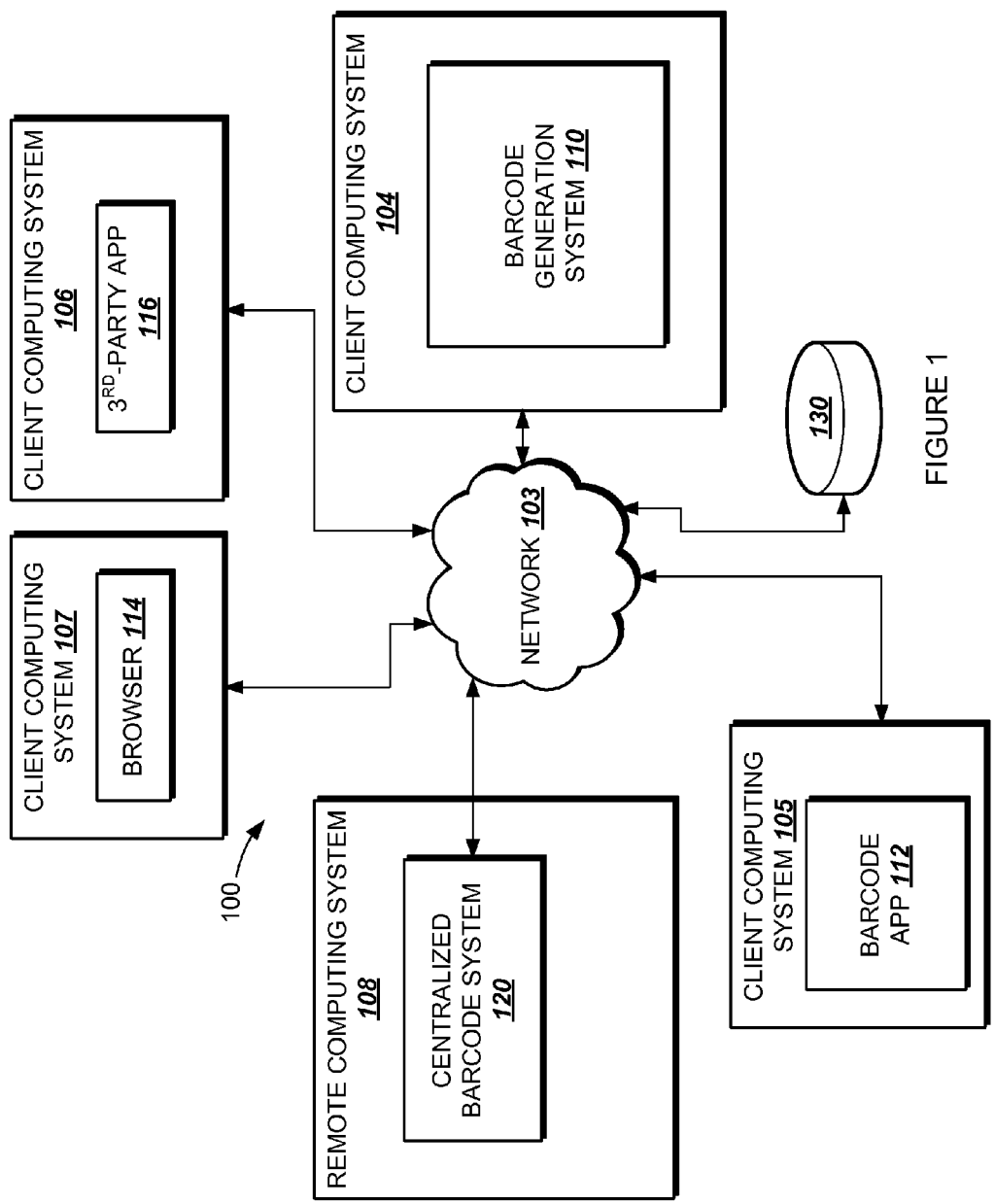
FIG. 1 is a block diagram of an example network architecture in which embodiments of a centralized barcode system may operate.

The embodiments described herein relate to one dimensional (1-D) barcodes (e.g., ISBN, UPC), two-dimensional (2-D) codes, three-dimensional (3-D) codes or NFC (Near Field Communication). Regarding 2-D codes, Denso Wave Incorporated created a type of matrix barcode (2-D barcode) called Quick Response Code, abbreviated QR Code® barcode. QR Code® is a registered trademark of Denso Wave Incorporated within the United States, Japan, Australia and Europe. The barcode includes black modules (square dots) arranged in a square pattern on a white background. The information encoded can be made up of four standardized kinds (also referred to as modes) of data, including numeric, alphanumeric, byte/binary, Kanji, or through supported extensions, virtually any kind of data. Unlike the 1-D barcode that was designed to be mechanically scanned by a narrow beam of light, the 2-D barcode, such as the QR Code®, is detected as a 2-D digital image by a semiconductor image sensor and is then digitally analyzed by a programmed processor. The processor locates the three distinctive squares at the corners of the image, and normalizes image size, orientation and angle of viewing, with the aid of a smaller square near the fourth corner. The small dots are then converted to binary numbers and validity checked with an error-correcting code. There are several standards in documents covering the physical encoding of the QR Codes® barcodes. The embodiments described herein focus on 2-D barcodes, such as the QR Codes® barcodes, however, in other embodiments, other types of barcodes capable of storing text greater than 10 characters in length may be used as would be appreciated by one of ordinary skill in the art having the benefit of this disclosure. In particular, the embodiments described herein relate to 2-D barcodes and the rendering of information and functionality associated with these barcodes. For ease of description, the term "barcode" is used to refer to these various types of codes as described above. The embodiments described herein aggregates unique functionality into the barcodes for commercial and consumer usage. The embodiments described herein enable the transformation of barcodes into interactive information nodes with optional extensions for asynchronous and synchronous communication, security protection, location tracking, cloud storage and social networking.

While barcodes are becoming more prolific, the chance that a consumer will engage with a website at the time of scanning may be limited. The embodiments described herein intend to create a more unique user experience by significantly broadening the functionality and customization of barcodes and introducing social elements into the creation and usage of such barcodes.

The embodiments described herein propose an open standard for storing information on barcodes. The proposed protocol governs the mechanism of embedding information on barcodes which may act as metadata for information stored on a server or a remote computing system (commonly referred to the 'cloud' computing) or to lookup offline content and additional functionality and filtering. For example, this might include checking for presence of communication features (user interaction), access control (security-protected content), location tracking and file folders. The proposed protocol also governs the steps involved in syncing all the information (intended for cloud storage), providing additional functionality configuration data with the server or cloud when metadata for embedding on the barcode is generated offline, such as when the device embedding metadata on the barcode is without direct access to the server or cloud.

The embodiments described herein create a customizable data encoded barcode, which allows users a unique method to communicate in a synchronous fashion. Communication may be based on a variety of formats including but not limited to text, video, voice and pictures.

FIG. 1 is a block diagram of an example network architecture 100 in which embodiments of a centralized barcode system 100 may operate. The network architecture 100 may include a client computing system 104 and a remote computing system 108, each connected via a network 103, which may be a private network (e.g., a local area network (LAN), wide area network (WAN), intranet, etc.) or a public network (e.g., the Internet). Additional client computing systems 105, 106, 107 can interact with the remote computing system 108 via the network 103. The remote computing system 108 can host a centralized barcode system 120 and the client computing system 104 hosts a barcode generation system 110. The remote computing system 108 can also host another instance of the barcode generation system 110 (not shown). In one embodiment, the barcode generation system 110 can be part of a mobile application 112 (referred to as "app") on a mobile device, smart phone or other type of electronic devices (e.g., tablets or other mobile devices). In another embodiment, the barcode generation system 110 is an application executing on a client device. In another embodiment, the barcode generation system 110 is a browser 114 or a browser plug-in that executes in connection with a browser on the client computing system. Also, the barcode generation system 110 can provide an application programming interface (API) that allows other applications to access the barcode generation system 110.

The remote computing system 108 may be one or more machines including one or more server computers, gateways, or other computing systems, including client machines, such as a desktop computer, laptop computer, server, cellular phone, personal digital assistant (PDA), etc., and server machines, including gateways, server workstations, etc. The remote computing system 108 can be configured to operate in a server-client environment or in a cloud computing system. Cloud computing systems are a collection of computing resources, such as hardware and software to provide a service over a network, such as the Internet. The client computing system 104 may be one or more machines, including a desktop computer, laptop computer, server, smart phone, cellular phone, personal digital assistant (PDA), etc. The client computing system 104 may also be a server machine as would be appreciated by one of ordinary skill in the art having the benefit of this disclosure. The remote computing system 108 interacts with the client computing system 104 by exchanging messages via standard protocols, e.g., FTP, HTTP, TCP, UDP, ICMP. The remote computing system 108 may be connected to one or more data stores, such as a centralized barcode database 130. The data stores can be one or more centralized data repositories that store application data, system data, configuration data or the like. The data stores may be local or remote data stores and may be single or multiple data structures (databases, repositories, files, etc.) residing on one or more mass storage devices, such as magnetic or optical storage based disks, tapes or hard drives. The centralized barcode database 130 can be a persistent storage that is capable of storing data. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. The centralized barcode database 130 can be internal to a mobile device or external to a mobile device and accessible by the mobile device via a network. As will be appreciated by those skilled in the art, in some implementations centralized barcode database 130 may be a network-attached file server or a cloud-based file server, while in other implementations centralized barcode database 130 might be some other type of persistent storage such as an object-oriented database, a relational database, and so forth.

The remote computing system 108 may provide a remote console, a local console or both for allowing a user, such as a system administrator, to access and manage the centralized barcode system 120 over a secure or non-secure channel. The remote computing system 108 can also provide a local console, such as a command line interface (CLI) or a graphical user interface (GUI) for the centralized barcode system 120.

The barcode generation system 110 can generate a barcode by creating a new barcode or copying an existing barcode and adding features to the existing barcode. For example, the barcode generation system 110 can link a cloud-based barcode to a physical barcode. By linking the cloud-based barcode to the physical barcode, the barcode generation system 110 can create a two-way communication mechanism through features that are supported by the centralized system. Each barcode created or copied on the platform (e.g., on the server or cloud or on the device) either is owned by a registered user on the platform or is published on the platform if a barcode was cloned from an existing barcode. The barcode generation system 110 can manage ownership of the barcodes. Ownership provides a the user an ability to edit the contents of the barcode and monitor and regulate activity associated with the barcode. Owners can also permit others to access or edit the barcode. These permissions can be given at the time of barcode creation, or at any later time.

The centralized barcode system 120 may be a network-hosted system divided into three components. The first component can be a server that provides an interface with external devices and other internal components. The second component can be a permission and preprocessing module, which authenticates user access for a particular barcode and preprocess any data required before transferring the same to the third component. The third component can be a database server, which can store data associated with a barcode in the data store 130. The centralized barcode system 120 can catalogue barcodes, either produced by barcode generation system 110, as described herein, or produced by an external barcode generator. Barcode scanners may allow for the identification of barcodes produced by either platform. The centralized barcode system 120 can identify duplicate or matching codes on the centralized barcode system 120 (e.g., in the database) and enable the communication feature and other features accordingly as described herein. In other embodiments, the centralized barcode system 120 may include more or less components than those described.

To generate a barcode, the barcode generation system 110 can encode information about an item of interest to form the barcode. The information can include a URL that directs a user to a webpage after scanning the barcode. The barcode generation system 110 can identify a subject and basic information about the subject. The barcode generation system 110 can provide a user interface to allow users to input the subject and basic information about the subject. The information about the subject of the barcode can include a unique number, a title, or an embedded URL. The barcode generation system 110 can encode the subject and the information about the subject into a barcode. In implementations, metadata is embedded in the barcode. For example, to generate a barcode about a fitness product, a user can input information about the product, such as a name of the product, a picture, a URL of a webpage that describes the product, etc. When generating a barcode, the barcode generation system 110 can also identify and embed supplemental information about an existing barcode. The supplemental information can include additional information about the item of interest, various features, a unique ID, configuration settings and flags and additional data into a barcode. The barcode generation system 110 can receive the supplemental information from a user, such as via a user interface, or from another system or module. When receiving the supplemental information from a user, the barcode generation system 110 can present different fields in a user interface to receive the supplemental information. When receiving the supplemental information from another system or module, the barcode generation system 110 can identify the existing information (e.g., product title or unique barcode) about the subject of the barcode. Using this information, the barcode generation system 110 can query a database (e.g., search the Internet) for supplemental information about the product title or unique barcode. The barcode generation system 110 can encode the supplemental information as part of the barcode. In some implementations, each of the fields is editable. In other implementations, some of the fields are editable. Example supplemental information include: title text, settings flags, data storage, additional data storage, group, communication (public, broadcast, or dialogue), location information, security features and any other information that relates to the item of interest, which are described further in conjunction with FIG. 6. When presented in a browser or an application in conjunction with the barcode, each supplemental information can be selectable and if selected, may be either embedded on the barcode or can be editable in the future. Any of the supplemental information can contain a maximum number or minimum number of characters. The number of characters can be fixed, editable or programmable. When presented as fields, supplemental information can include any number of the same supplemental information fields. For example, supplemental information can include two data storage fields—a data storage field and an additional data storage field.

Once a barcode is generated, the barcode generation system 110 can save a database record for each barcode along with each feature either on the barcode or in the cloud depending on the initial settings. To the extent a feature is editable in the future, as designated by a setting in the barcode generation system 110, the feature can be saved in the cloud whereas non-editable features can be saved in the barcode as permanent metadata. Additionally, the user, without an active Internet connection, may create a barcode, which then becomes synchronized with a unique ID fetched from a reserved pool using the barcode generation system 110. The pool of unique IDs is saved locally on device for offline usage when the user logins for the first time on the device and these unique IDs correspond to reserved entries on the centralized barcode database 130. This allows a user to generate a barcode with the feature set (e.g., supplemental information) they desire without an active internet connection. Information captured offline is stored locally on the device in which the barcode generation system 110 executes, such as a mobile device. Additionally, since a new barcode can be generated using a single unique ID new barcode can be generated offline. Finally, when online, all offline information is synchronized to the server or cloud at the given unique ID.

In implementations, the barcode generation system 110 can provide additional functionality, such as copying (e.g., cloning), sharing, scanning barcodes, etc. The copying feature of the barcode generation system 110 can enable a user to create a custom barcode from a non-platform generated barcode (e.g., not generated by the barcode generation system 110) or a platform-generated barcode. By copying an existing barcode, either platform created or generic, a user can create or embed the same or different functionality from the original barcode. The copied barcode can be shared distinctly and separately from the original barcode. In some implementations, the barcode generation system 110 can share barcodes created or copied on the platform to the registered users directly or can be searched if the created/cloned barcode is made public.

In some implementations, the network architecture 100 includes a barcode scanner. For example, a user can print a barcode created or copied on the barcode generation system 110 and the user or other users can scan printed barcode using any barcode scanner reader to view the underlying information along with additional features.

In implementations, the barcode generation system 110 can be used for viewing of information associated with the barcodes. User can access any of the barcodes created or copied on the platform via a third-party application, such as a mobile application, an application provided as part of the centralized barcode system (referred to proprietary mobile app), or a browser or browser plug-in.

In implementations, a $3^{rd}$ party mobile application 116 can include a barcode scanner. Using the scanner, the $3^{rd}$ party mobile application 116 can decode the barcode to identify a URL. The URL can identify an address of a webpage. Once the URL is detected, a browser can open. The browser can render the webpage identified by the URL.

In implementations, a barcode app 112 can include a barcode scanner. Using the scanner, the barcode app 112 can decode the barcode to identify a barcode. In other implementations, barcodes can be accessed via accessing the barcodes directly from a user account or using search functionality. The app 112, or a browser, can render the barcode as per the features present on barcode.

In implementations, the barcode generation system 110 can be used in connection with pre-printed (e.g., existing) barcodes. Pre-printed barcode may be barcodes with a unique ID embedded in the barcode. In some implementations, a user who acquires the pre-printed barcode and scans it into the barcode generation system 110 becomes the new owner and is assigned a unique ID for their usage. In other implementations, a true owner of the subject of the barcode is given control of the unique ID regardless of who scans in the pre-printed barcode. Three types of pre-printed barcodes can be available: pre-printed editable barcodes, pre-printed fully-editable barcodes, and pre-printed generic barcodes.

In implementations, barcodes are editable. A user can edit any information associated with the barcode along with content. The user can add, remove, edit or any combination thereof any of the features information. In other implementations, the user can link a pre-printed generic barcode to any barcodes created on the barcode generation system 110 via a mobile app or a browser if the user has access permission to the barcode (e.g., when the communication setting of the barcode is public or dialogue). Other users can be redirected to the linked barcode whenever the other use scans the generic barcode.

The following description provides some example use cases of the proposed embodiments.

Broadcast Code Use Case: A consumer product company places a barcode generated by the barcode generation system 110 on a product brochure. A user purchases the product and scans the barcode on either barcode app 112 or a third party scanner app 116. The company is now directly connected with the consumer and can send them new offers, product updates, or simply information relating to the product or the company. The user can receive these updates in an asynchronous fashion and can launch the company's website from a barcode page. The company's website can be rendered when the company's barcode is selected from the users list of saved codes.

Dialogue Use Case: A company places a barcode at a point of purchase to gather feedback on a retail clerk. A consumer scans the code. The centralized barcode system 120 renders the page allowing for individuals to leave comments. The company may respond to the comments or broadcast messages.

Synchronous Communication Use Case: A greeting card company offers pre-printed barcodes at the point of purchase. A consumer purchases a greeting card and is given a barcode stamp. The purchaser places the stamp on the back of the greeting card and scans the barcode. The scanned barcode brings the user to the centralized barcode system 120 which allows them to post a message—either a video, audio message or text message. The code can then be scanned by the recipient of the card. Scanning the barcode would populate the barcode page and the video (or other media) could then be viewed by the recipient.

Synchronous Communication with Security Use Case A: A teacher appends a barcode generated by the barcode generation system 110 to the top of a homework assignment. The homework gets distributed to students. The students scan the barcode and put in the security code that the teacher distributed. Students can post questions, comments and observations which can be seen by the entire class and commented on by the class or by the teacher via the centralized barcode system 120. Updates to the homework assignment can further be pushed to the class from the teacher through the centralized barcode system 120.

Synchronous Communication with Security Use Case B: An individual within a company places a platform generated barcode on a draft document. Individual recipients of the document can scan the code and enter their security password. The original distributor of the document can receive comments from those working on the document and can send the updated document through the centralized barcode system 120. The ability to post a new document eliminates the need to email the document around to other co-workers.

Third Party Barcode: A user scans a barcode from an advertisement in a magazine. The barcode is scanned with the barcode app 112. Given the third party nature of the code, anyone can scan the barcode and post comments, questions, reviews in text, audio, or video formats. Anyone using the barcode app 112 will be able to view all comments left by others who have scanned the barcode.

Figure 2:
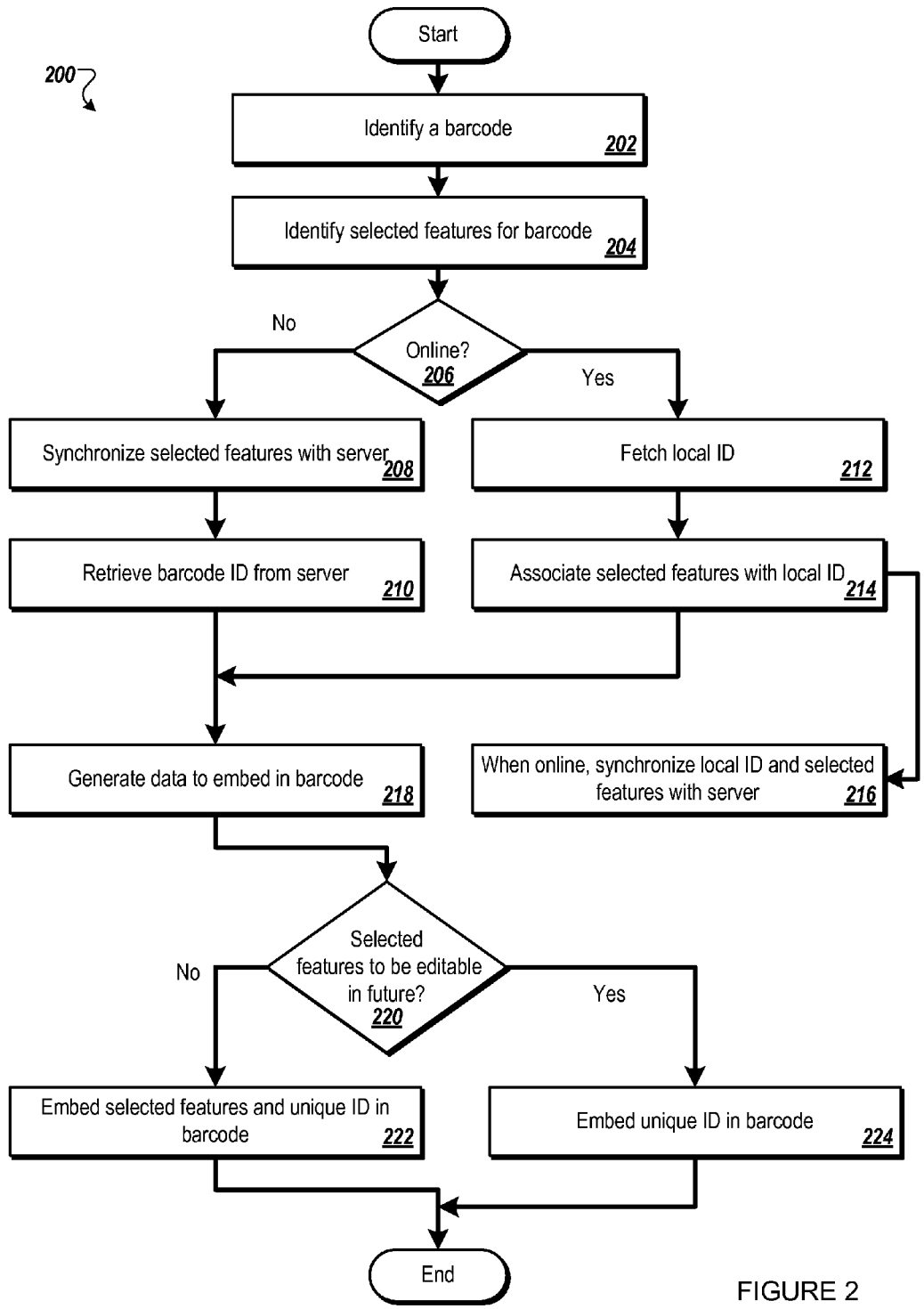
FIG. 2 is a flow diagram illustrating a method of barcode generation according to one embodiment.

FIG. 2 is a flow diagram illustrating a method 200 of barcode generation according to one embodiment. The method 200 may be performed by processing logic that may comprise hardware (circuitry, dedicated logic, etc.), software (such as is run on a general purpose computing system or a dedicated machine), firmware (embedded software), or any combination thereof. The processing logic, for example, can be executed by a client computing system, such as client computing system 104, 105, 106, 107 of FIG. 1.

Referring to FIG. 2, method 200 begins at block 202 with processing logic identifying a barcode on a barcode generation system, such as the barcode generation system 110 of FIG. 1. In implementations, to identify the barcode, the processing logic can create a new barcode. In other implementations, identifying the barcode includes copying an existing barcode with the option to add supplemental information to the existing barcode. In other implementations, identifying the barcode includes identifying a unique identifier associated with the item of interest and associating the supplemental information and the first information with the unique identifier. The processing logic can receive input from a user to create a new barcode or copy an existing barcode. Once the barcode is identified, at block 204 the processing logic can identify certain features for the barcode, such as editable information, security settings, communication settings and an ability for users to add supplemental information to the barcode. The processing logic can receive these features from a user. When the processing logic has network access at block 206, the enabled features can be synchronized with centralized a barcode system at block 208, which then returns a new unique ID that identifies the barcode at block 210. In implementations, when the processing logic does not have network access (e.g., not connected to the internet, offline) at block 206, the processing logic can fetch a barcode ID from pool of unique IDs at block 212 and associate the enabled features with the unique ID at block 214. For example, when a user device, such as mobile device, is not connected to the internet, the processing logic can fetch a barcode ID that has been associated with the user device, or associated directly with a user of the device. When the processing logic later becomes connected to the network, the enabled features and the barcode ID is synced with a centralized system at block 216.

In some implementations, the scanned barcode can already have a barcode ID, such as when it has previously been scanned. In some implementations, another barcode ID can be associated with the barcode, resulting in two different barcode ID's for the same source barcode. In other implementations, the scanned barcode can be combined with the existing barcode ID. The information, supplemental information and enabled features can be combined and/or synchronized. When conflicting information, supplemental information and enabled features exists for a particular barcode, a conflict analysis can be performed to determine which data to use. Any type of analysis can be performed using any criteria, such as how long the barcode ID has existed, whether there is a commercial owner of the barcode or item of interest associated with the barcode, whether a particular user that edited or added the supplemental information had a particular permission or platform rank, etc.

Once the processing logic identifies the Unique ID, the processing logic generates the data to be embedded on the barcode at block 218. Enabled features, for example, can be represented by flags, which can be embedded on barcode permanently depending on whether selection of features itself is editable in future or not. If editable, then only unique ID is embedded on the barcode; otherwise the embedded data contains the feature flags.

Next at block 220, the processing logic identifies if any of the selected features are editable in future or non-editable. If the selected features are non-editable, then the processing logic embeds the selected features, the unique ID and any configuration data associated with selected features in the barcode at block 222. A barcode could have a variety of features embedded into the same code with different features being editable or non-editable depending on the barcode creator's preference. As such, a single barcode could have a blend of features that may be embedded permanently (non-editable) and non-permanently (editable). The barcode creator's selection of non-editable features can trigger flags that are embedded into the barcode to identify which features are present. The features, as represented by the flags, may have additional information and rules that are associated with them that are stored on the centralized barcode system. If the selected features are editable, then the processing logic embeds the unique ID in the barcode at block 224, which points a later user to an interface for viewing and editing the editable features.

In implementations, when generating the barcode, the processing logic can save the barcode data in a URL friendly format and can combine it URL. In these implementations, data intended to be embedded on the barcode is converted into a URL friendly format (e.g., URL-encoding/percent encoding is applied for all ASCII special characters, etc.) and the result is finally prepended or appended to the URL of centralized barcode server. The result is a URL that points to a web/browser version of the barcode. For example, the resulting URL with prepended encoded data can be "barcode123.example.com" and a resulting URL with appended encoded data can be "example.com/barcode123."

The rendering of the barcode can take place on any device, such as on an app 112, through a web/browser interface 114, or through a third party scanner app 116, as described herein.

Figure 3:
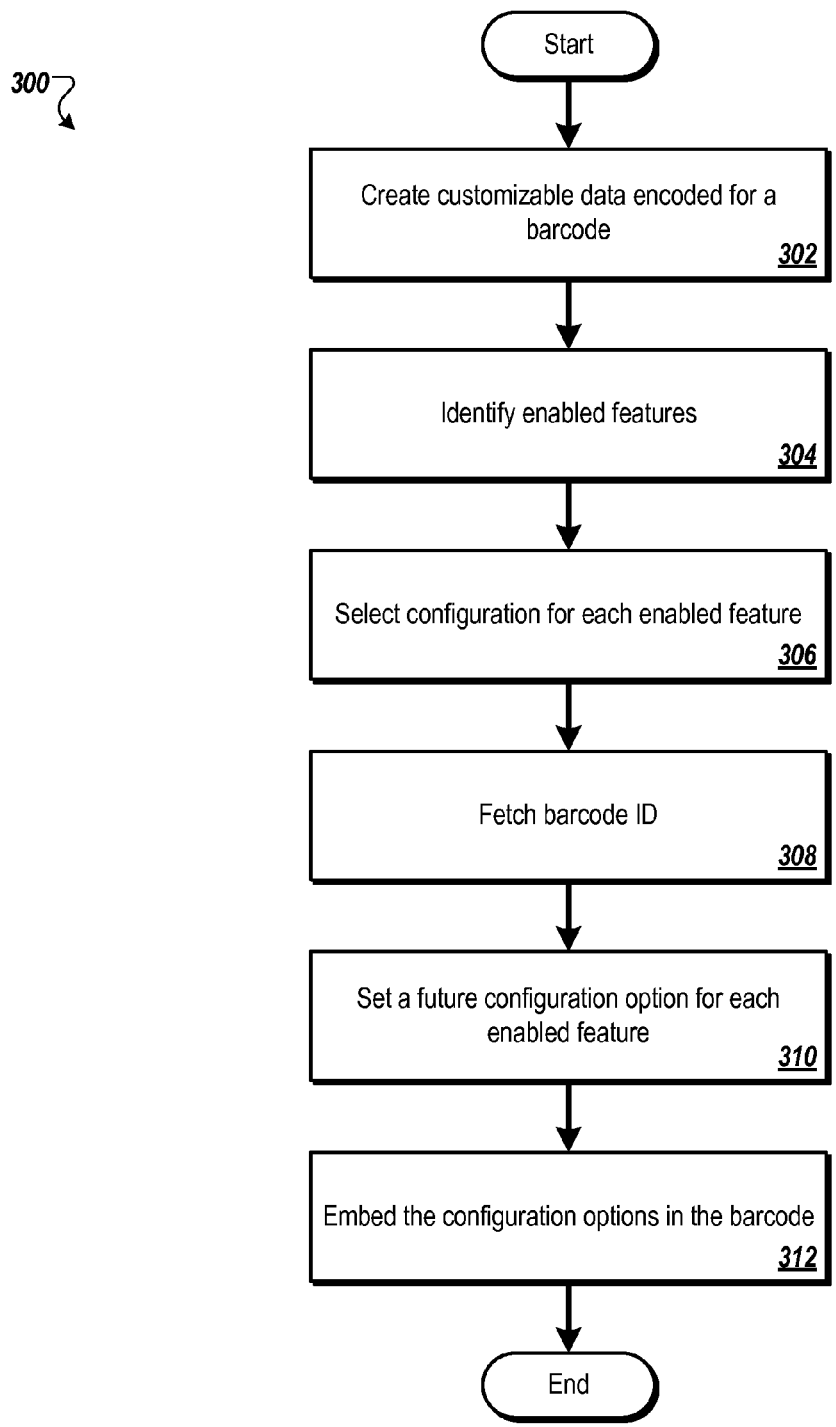
FIG. 3 is a flow diagram illustrating a method of barcode generation according to another embodiment.

FIG. 3 is a flow diagram illustrating a method 300 of barcode generation according to another embodiment. The method 300 may be performed by processing logic that may comprise hardware (circuitry, dedicated logic, etc.), software (such as is run on a general purpose computing system or a dedicated machine), firmware (embedded software), or any combination thereof.

Referring to FIG. 3, the method 300 begins at block 302 with the processing logic generating data to be embedded on the barcode based on users choice of features from list of features available, as described herein. In implementations, all data can initially be generated in JSON format which is widely supported on all platforms. Then the JSON format is converted into a URL friendly format by URL-encoding approach and URL of centralized system is prepended to the data. The result is a URL which points at the barcode information on centralized system.

At block 304, the processing logic identifies features to enable, which can be based on user input. Example features include a title, description (data storage), a communication setting, and a security setting. When these features are represented by flags, the flags can be 't,' 'd,' 'c,' and 's,' respectively.

At block 306, the processing logic selects a configuration for each feature. For example, the communication setting can be set to public, broadcast, or dialogue. For the public communication setting, the JSON configuration can be 'PUBLIC.PUBLIC.' The description, for example, can be for an audio file and the JSON configuration can be 'AUDIO.FILE.' The title can be a text-based title of the subject of the barcode, such as 'Sample Barcode."

At block 308, the processing logic fetches an ID for the barcode to be generated. In implementations, the processing logic has network access and receives the barcode ID from a server. In other implementations, processing logic is offline and fetches a local ID that can later be synchronized with a server when the processing logic is online.

At block 310, the processing logic sets future configuration options for the enabled features. For example, additional features can be enabled or disabled in the future. The processing logic can set this configuration using, such as with a code {'i':'1234}. The processing logic can also enable editing of the enable features, such as the communication, description and title features, in the future. For example, the description feature is editable using the code: {'i':'1234, 's':'c.d.t', 's_': {'ty':'PUBLIC.PUBLIC'}, 's_t':'Sample Barcode'}. The processing logic can also indicate statically encoded data for all features, such as in the code: {'i':'1234, 's':'c.d.t'. 's_c': {'ty':'PUBLIC.PUBLIC'}, 's_d':{'ty':'AUDIO.FILE'}, 's_t':'Sample Barcode'}.

At block 312, the processing logic embeds the data on a barcode, such as on a URL associated with a barcode system. For example, the barcode can be encoded as: www.example.com/barcode/{'i':'1234, 's':'c.d.t', 's_c':{'ty':'PUBLIC.PUBLIC'}, 's_t':'Sample Barcode'}. The encoded barcode can be encoded in a URL-friendly format, such as example.com/barcode %7B %3Fi %3F %3A %3F1234%2C+%3Fs %3F %3A %3Fc.d.t %3F %2C+%3Fs_c %3F %3A %7B %3Fty %3F %3A %3FPUBLIC.PUBLIC %3F %7D %2C+ %3Fs_t %3F %3A %3FSample+Barcode %3F %7D. In another implementation, the data can be saved as it is, such as: {'i':'1234, 's':'c.d.t', 's_c':{'ty':'PUBLIC.PUBLIC'}, 's_t':'Sample Barcode', 'y':'example.com/barcode/'}.

Figure 4:
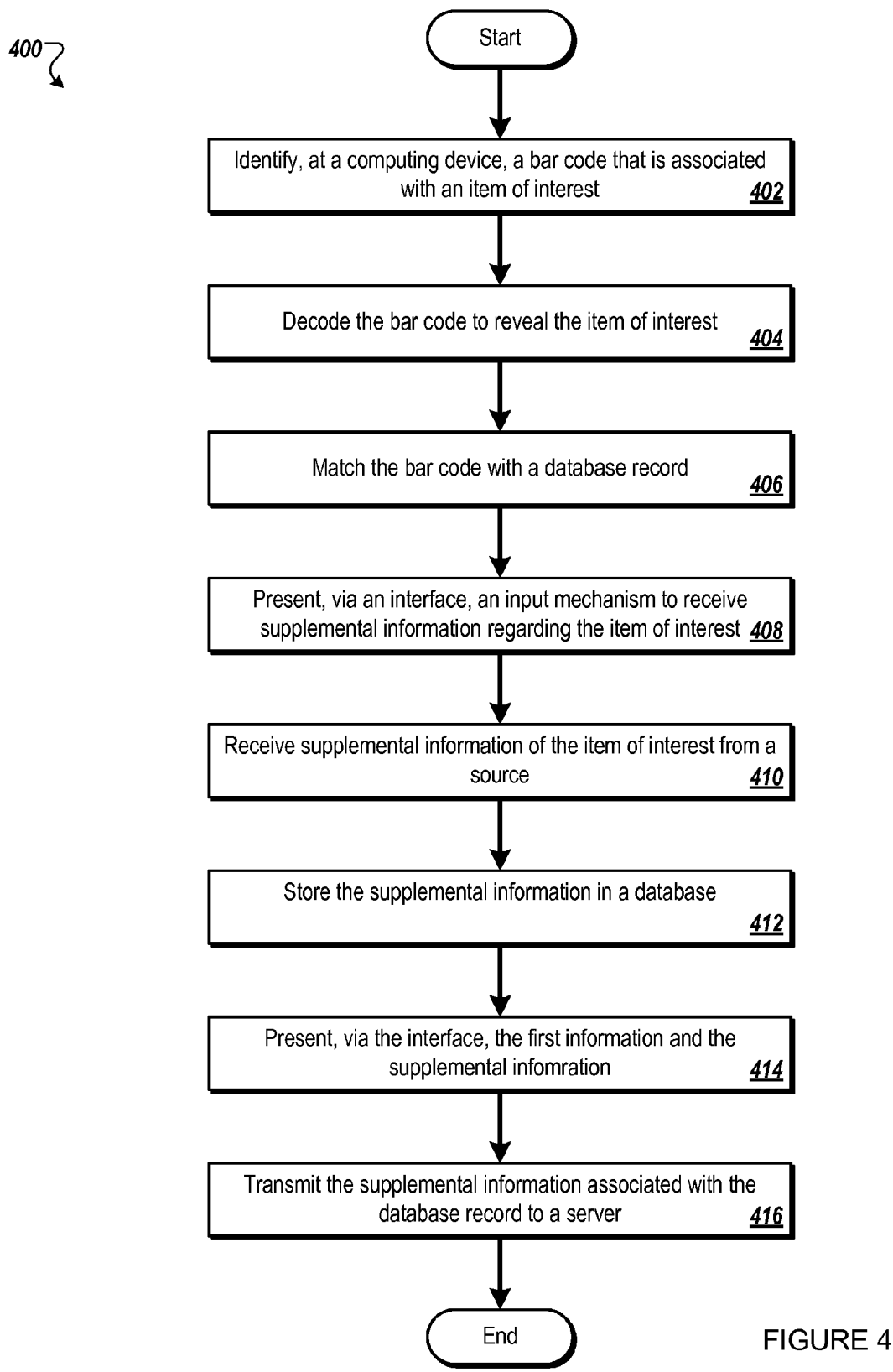
FIG. 4 is a flow diagram illustrating a method of associating supplemental information to a barcode according to an embodiment.

FIG. 4 is a flow diagram illustrating a method 400 of associating supplemental information to a barcode according to another embodiment. The method 400 may be performed by processing logic that may comprise hardware (circuitry, dedicated logic, etc.), software (such as is run on a general purpose computing system or a dedicated machine), firmware (embedded software), or any combination thereof.

Referring to FIG. 4, method 400 begins at block 402 when processing logic identifies a barcode, which can be a previously generated barcode. Identifying the barcode can also include generating the barcode by copying an existing barcode or by creating a new barcode. The barcode can be associated with an item of interest, such as a product, good, service, person, entity, corporation, etc. At block 404, the processing logic decodes the barcode to reveal the item of interest. At block 406, the processing logic matches the barcode with a database record. The database record can be a local record or a remote record, such as a record stored in a remote database.

At block 408, the processing logic presents, via a graphical interface, an input mechanism to receive supplementation information regarding the item of interest that is not encoded in the barcode and at block 410, the processing logic receives supplemental information of the item of interest, such as from an end user. The first information and the supplemental information can include at least one of: a title text, a setting, a group, a file, a photo, a communication, a video, audio, a location, a social component, a comment, or a security setting. The supplemental information can be information that is has not been associated with the item of interest. For example, the first information of an existing barcode can be a title of a movie and the supplementary information can be a total playback length.

At block 412, the processing logic can store the supplemental information with the database record. At block 414, the processing logic can present, via the graphical interface, the first information and the supplemental information. In implementations, the processing logic transmits the supplemental information associated with the database record to a server at block 416.

In some implementations, the processing logic can generate a second barcode that comprises the database record, the first information and the supplemental information.

In implementations, the processing logic can receive a request to edit at least a portion of the first information or the supplemental information. The processing logic can then modify the first information or the supplemental information in the database record. In implementations, the processing logic permits modifications to the first information or the supplemental information according to enabled features for the barcode. For example, when a barcode is public, it can be modified, amended, supplemented, etc.

In implementations, the processing logic can encode the supplemental information in a Uniform Resource Locator (URL) friendly format such that the encoded supplemental information can be added to an existing URL to create a new URL that, when accessed, causes the supplemental information to be presented, such as along with or in the place of the first information of the item of interest. The encoded supplemental information can be prepended or appended to the existing URL to create the new URL. In implementations, when processing logic presents the first information and the supplemental information it can cause an application to render the first information and the supplemental information. The rendering of the first information and the supplemental information can be based on the new URL.

Figure 5:
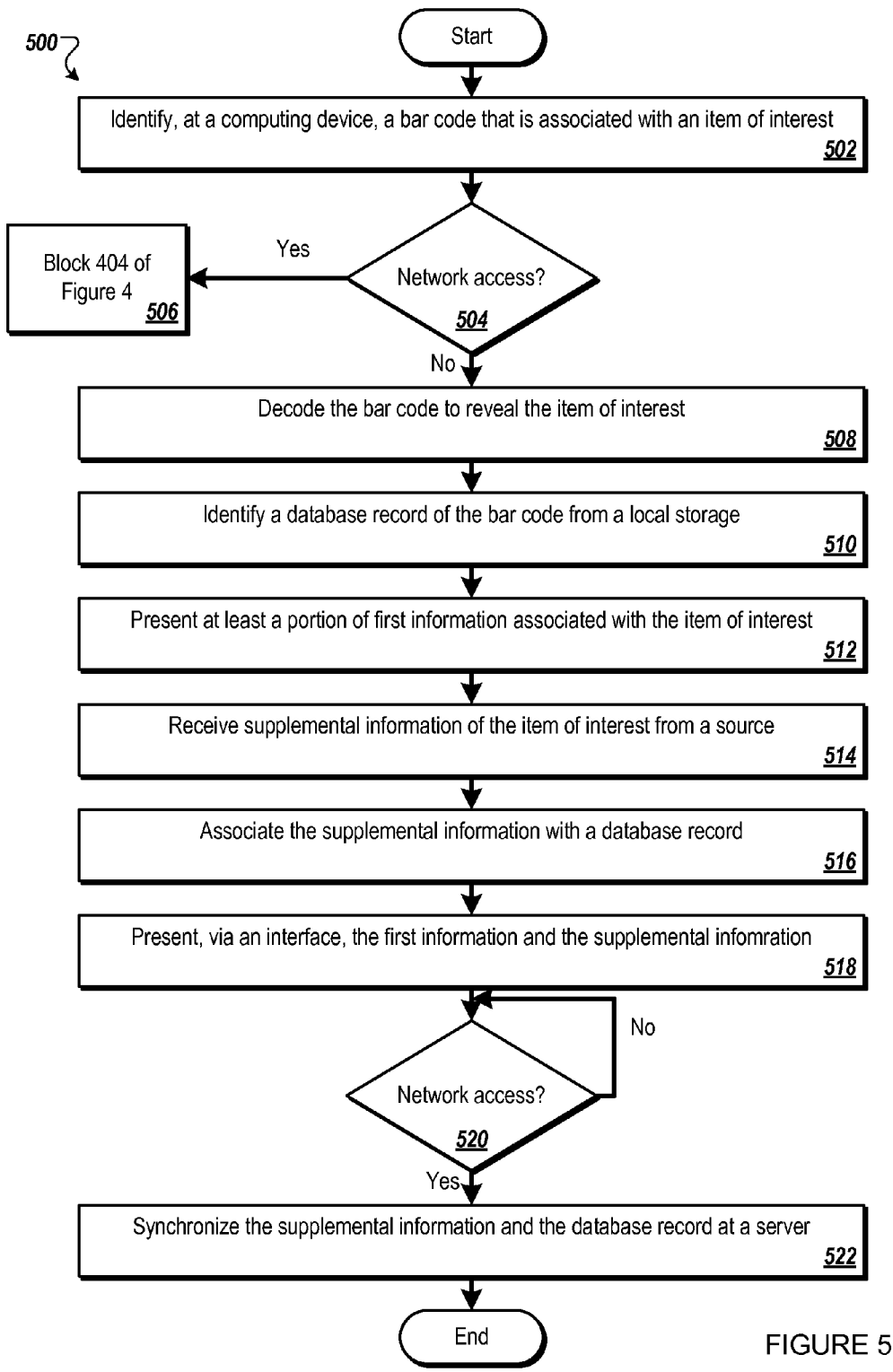
FIG. 5 is a flow diagram illustrating a method of associating supplemental information to a barcode according to an embodiment.

FIG. 5 is a flow diagram illustrating a method 500 of associating supplemental information to a barcode according to another embodiment. The method 400 may be performed by processing logic that may comprise hardware (circuitry, dedicated logic, etc.), software (such as is run on a general purpose computing system or a dedicated machine), firmware (embedded software), or any combination thereof.

Referring to FIG. 5, method 500 begins at block 502 when processing logic identifies a barcode that is associated with an item of interest. At block 504, the processing logic determines whether it has access to a network (e.g., a LAN, WAN, Internet, etc.). If the processing logic has network access, it can proceed to block 506, which begins at block 404 of FIG. 4. If the processing logic does not have network access, it can proceed to block 508 where it decodes the barcode to reveal the item of interest. At block 510, the processing logic identifies the database record of the barcode from a local storage. The local storage can include at least a portion of the first information. In some implementations, the at least a portion of the first information includes an amount of data that minimizes its storage footprint on a mobile device. In implementations, the database record can include a unique identifier associated with the item of interest.

At block 512, the processing logic presents the at least a portion of the first information from the local storage, such as via a user interface. At block 514, the processing logic can receive supplemental information of the item of interest from a source. The source can be a user or can be from an electronic data source. At block 516, the processing logic can associate the supplemental information with a database record. In implementations, the processing logic can associate the supplemental information and the first information with a unique identifier, such as the unique identifier optionally that the processing logic optionally identified in block 510. At block 518, the processing logic can present, via an interface, the first information and the supplemental information.

At block 520, the processing logic can determine whether it has network access. The processing logic can perform block 520 at any time. If the processing logic does not have network access, it can continue to perform block 520. In an example, the processing logic periodically checks for network access. Once the processing logic determines that it has network access, it can synchronize the supplemental information and the database record at a server.

In implementations, the processing logic can detect a connectivity characteristic. The connectivity characteristic can be at least one of an amount of available bandwidth, an amount of total bandwidth, or a detected network speed. The processing logic can present the first information and the supplemental information by selectively presenting the first information and the supplemental information according to the connectivity characteristic. For example, when a limited amount of bandwidth is available, the processing logic can present a video in a lower resolution. In another example, when detected network speed is below a threshold amount, the processing logic can present some of the supplemental information and omit other supplemental information until the detected network speed is above a threshold amount.

Figure 6:
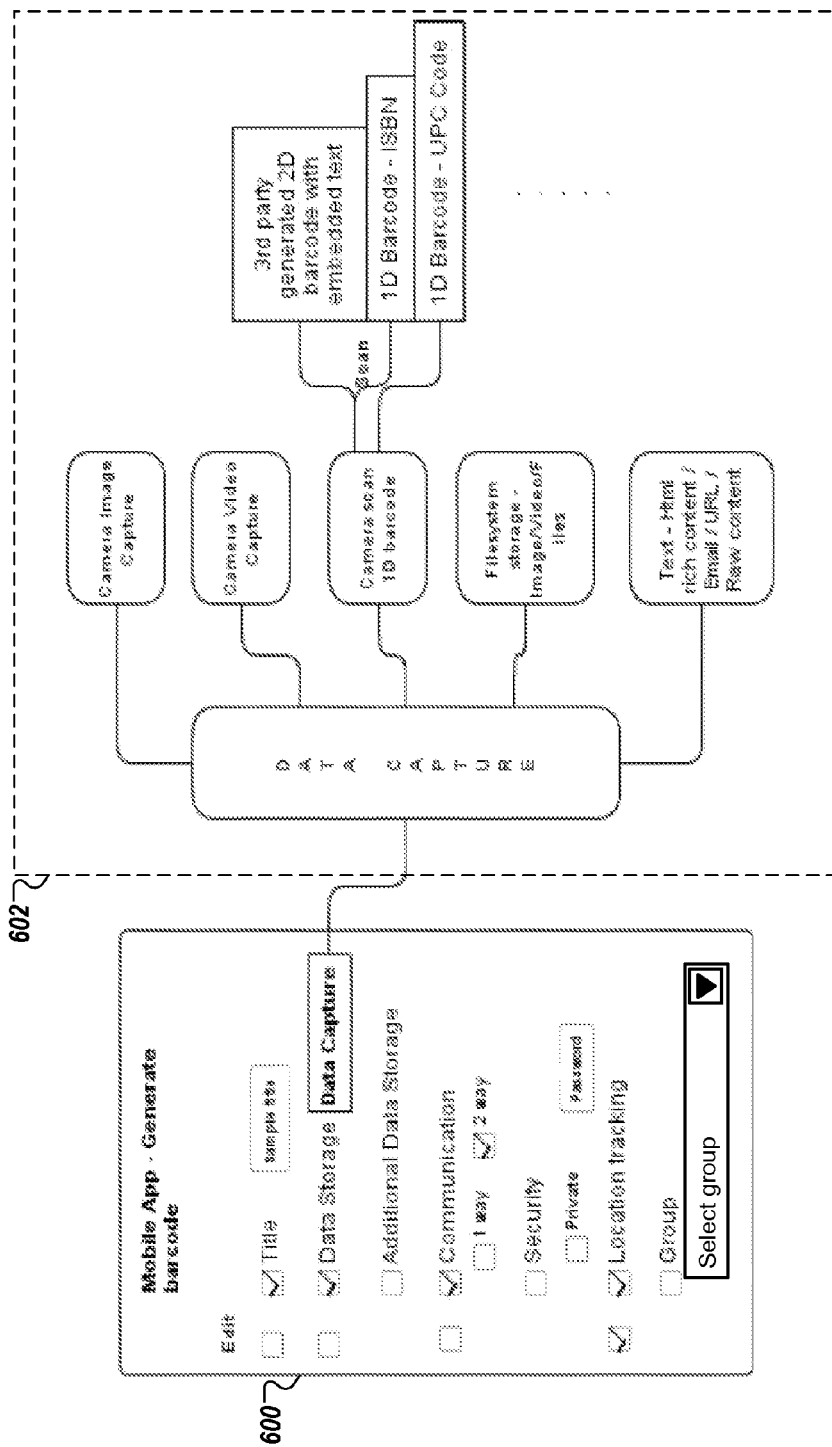
FIG. 6 illustrates an example graphical user interface for generating or modifying a barcode according to embodiments.

FIG. 6 illustrates an example graphical user interface (GUI) 600 for generating or modifying a barcode. GUI 600 can be a user interface allowing a user to interact with a barcode generation system, such as the barcode generation system 110 of FIG. 1. GUI 600 can include one or more user interface tools. As the term is used herein, a user interface tool refers to any single graphical instrument or combination of graphics controls that permit a user to input information to a computer system. Common conventional user interface tools include visual output for one or more buttons, text boxes, scroll bars, pictures, spin dials, list boxes, search boxes, select options, etc.

GUI 600 that allows a user to select or enable features from the list of supported features of the barcode generation system 110. When generating a barcode, the barcode generation system 110 can also define interaction settings and associate the interaction settings with the barcode. The interaction settings can dictate how recipients may view or interact with the barcode. The interaction settings can include communication settings and security settings. When creating or editing a barcode, the GUI 600 can permit a user to select data from one or more data sources 602. Data sources 602 can include a local or remote video or image sensor, a barcode scanner, a data storage, or a text-based source, such as an email, URL, etc. In an example, a user can select a photo or video to associate with a barcode from a data source 602. The barcode generation system 110 can store the features, settings and configurations instantaneously in the cloud and can generate a unique ID embedded within the barcode. If available, features are stored instantaneously else the IDs are saved locally on the device for offline usage as described herein. Each generated barcode can be identified by a unique ID, and the database uses the unique ID to coordinate a data storage 130, such as a relational database of information. The unique ID can be how components of architecture 100 identify which barcode is being matched with users anywhere and the barcodes and information that would get synchronized on a user's different access points. Examples of data that can be collected by the GUI are described below.

Title text can be general descriptive information of a subject of a barcode (e.g., product, service, offering), that is stored and displayed in an interface. The text title A data storage field can be used to store any type of information based on a content type. For example, when the content type is a video, the data storage field can be information specific to videos. Information can be stored as text or as a file. Information can be offline or present on the cloud.

A communication setting enables a user to define precisely how they wish recipients' to interact with the barcode or how they wish to interact with the recipient of a barcode. The communication setting establishes synchronous or asynchronous features associated with the barcode. For example, communication settings can include public, broadcast and dialogue. When the public setting is enabled, the barcode generation system 110 can allow users to edit the information of supplemental information of a barcode. The information may be in the form of text, video, pictures or audio. Anything that is edited or added to a public barcode by any user can be displayed under the barcode for viewing universally. The public setting does not allow the individual who created the barcode to regulate the dialogue.

With the broadcast setting selected, the barcode generation system 110 allows barcode creators (e.g., someone who uses the barcode generation system 110 to create a barcode) to send information in an asynchronous fashion to a recipient of a barcode. Only information distributed by the barcode creator can be visible to other recipients. This setting may be configured to be restrictive whereas the pubic and dialogue settings may give more access to more users. For example, the broadcast feature could be used by a government agency to broadcast information without necessarily eliciting responses.

The dialog setting enables the creator of the barcode to send information in an asynchronous fashion and allows users to respond or post information under a barcode using the barcode generation system 110. The dialogue setting does not allow users to see comments posted except those that were posted by themselves or the creator of the barcode. Only the dialogue between the owner of the barcode and the recipient can be viewable.

Security settings allow barcode creators to restrict access to barcodes generated on the barcode generation system 110. For example, the barcode generation system 110 can provide different security options for the barcode creators including private and passcode protected. To the extent the barcode creator chooses private, only the individual who created the barcode (e.g., an account associated with the barcode creator) has access the barcode and use the other features, such as adding supplemental information to the barcode. A barcode creator may still share a private barcode, but only specifically authorized individuals can view that barcode. The barcode creator may also password protect a barcode. A password-protected barcode must be shared specifically with identified individuals. After the sharing of a password-protected barcode, any user can enter the passcode to gain access.

Location tracking can be used to track a location of a device that scans the barcode.

A group setting can be used to enable grouping various barcodes together, such as under one commonality (e.g., tag). The group setting allows users to organize similar barcodes for ease of display and access, such as by using tags. Group settings allow users to create groups or append a new barcode to an existing group. For example, a group of barcodes can be grouped under a common theme (e.g., healthy foods), a common group of people (e.g., cyclists), or under a commercial group (e.g., products sold by a particular company).

Figure 7:
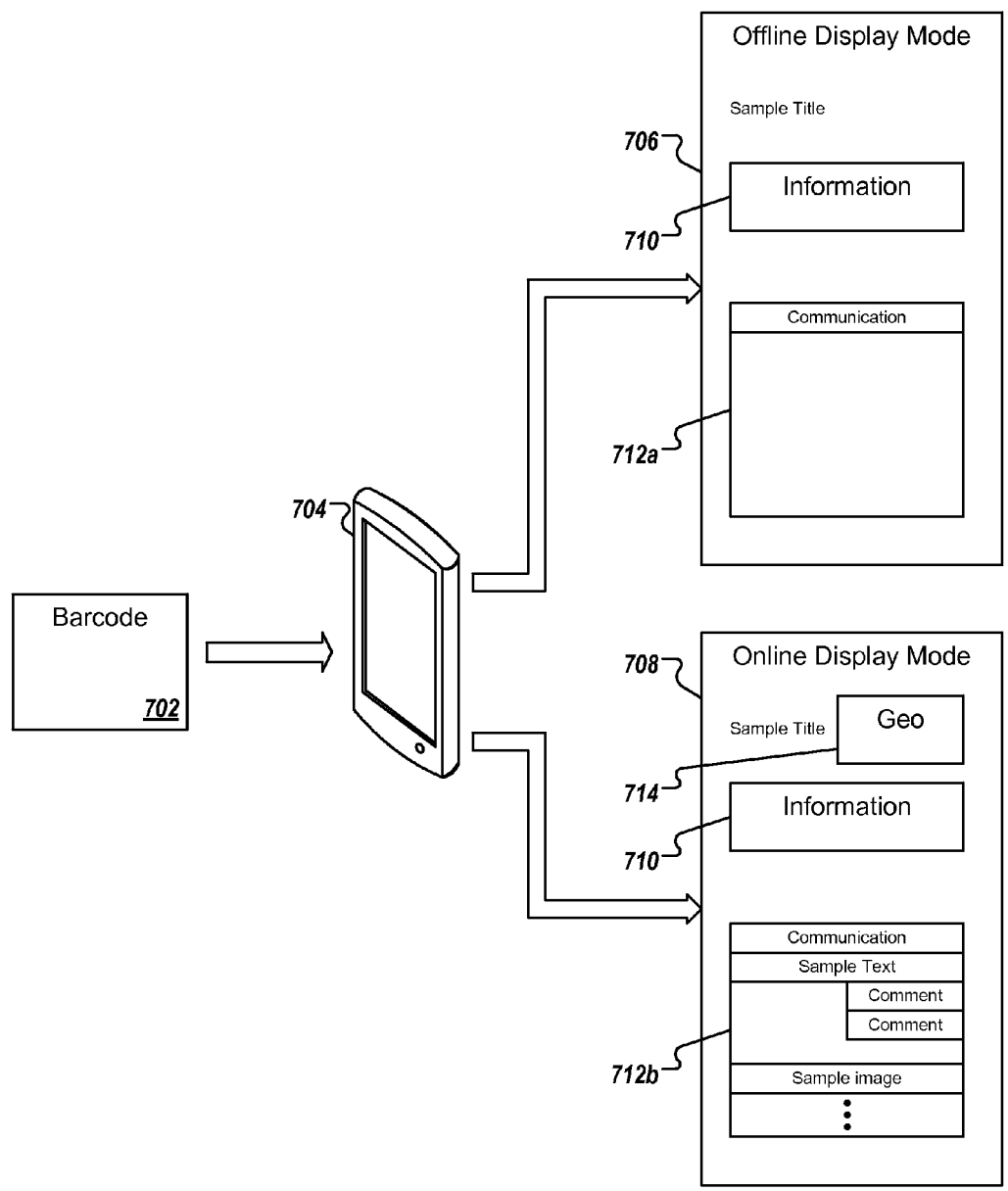
FIG. 7 illustrates example GUIs when a barcode scanner is online or offline according to embodiments.

FIG. 7 illustrates example GUIs when a barcode scanner is online or offline. In implementations, barcode scanning can be divided into two phases: online mode where both embedded/non-embedded (fetched from centralized server) information is displayed and offline mode where content is displayed based on information embedded in the barcode.

The barcode scanner can be part of an app, such as app 112 or $3^{rd}$ party app 116 of FIG. 1. The app 112 can display the information and supplemental information through an interface. The $3^{rd}$ party app 116 may not have direct access to the supplemental information so it can use APIs to retrieve and display all of the features and information as the app 112. A web interface can also be used to present information and supplemental information related to a barcode. In implementations, a user can have an account and scanned barcode are synchronized among devices that user associates with the account. For example, when a user scans a barcode using a mobile device, the user can later view the scanned barcode using a desktop computer after logging into her account. When the barcode scanner scans a barcode an embedded URL can redirect to an interface of the system on a device or the web. When using the app 112, the app 112 can natively renders the barcode information and supplemental information through an integrated interface. When using a $3^{rd}$ party app 116, it can re-direct the user to a centralized barcode system (e.g., the centralized barcode system 120 of FIG. 1) based on the URL, which then can renders the barcode information and supplemental information. In implementations, non-native apps may offer limited capability, while a native app can support all features (e.g. audio recording is only supported by the app).

When scanning a barcode 702, a barcode scanner (e.g., a mobile device) 704 can be online or offline. When the barcode scanner 704 is offline, it can present an offline GUI 706 via a display. The offline GUI 706 can present information 710 related to the barcode and other information 712a. When the barcode scanner 704 is offline, it may not have access to all of the available information 712a related to the barcode 702. Thus, when in offline mode, information 712a can be limited.

When the barcode scanner 704 is online, it can present an online GUI 708 via a display. The online GUI 708 can present information 710 related to the barcode and other information 712b. When the barcode scanner 704 is online, it may have access to all of the available information 712b related to the barcode 702. Thus, when in online mode, information 712b can be more detailed than information 712a when in offline mode. In implementations, other features can be available when the barcode scanner 704 is online. For example, an online barcode scanner 704 can include a geo-location component 714 that can track a location of the barcode scanner 704. In implementations, the geo-location component 714 can present geo-location of the barcode scanner 704 via online GUI 708.

Figure 8:
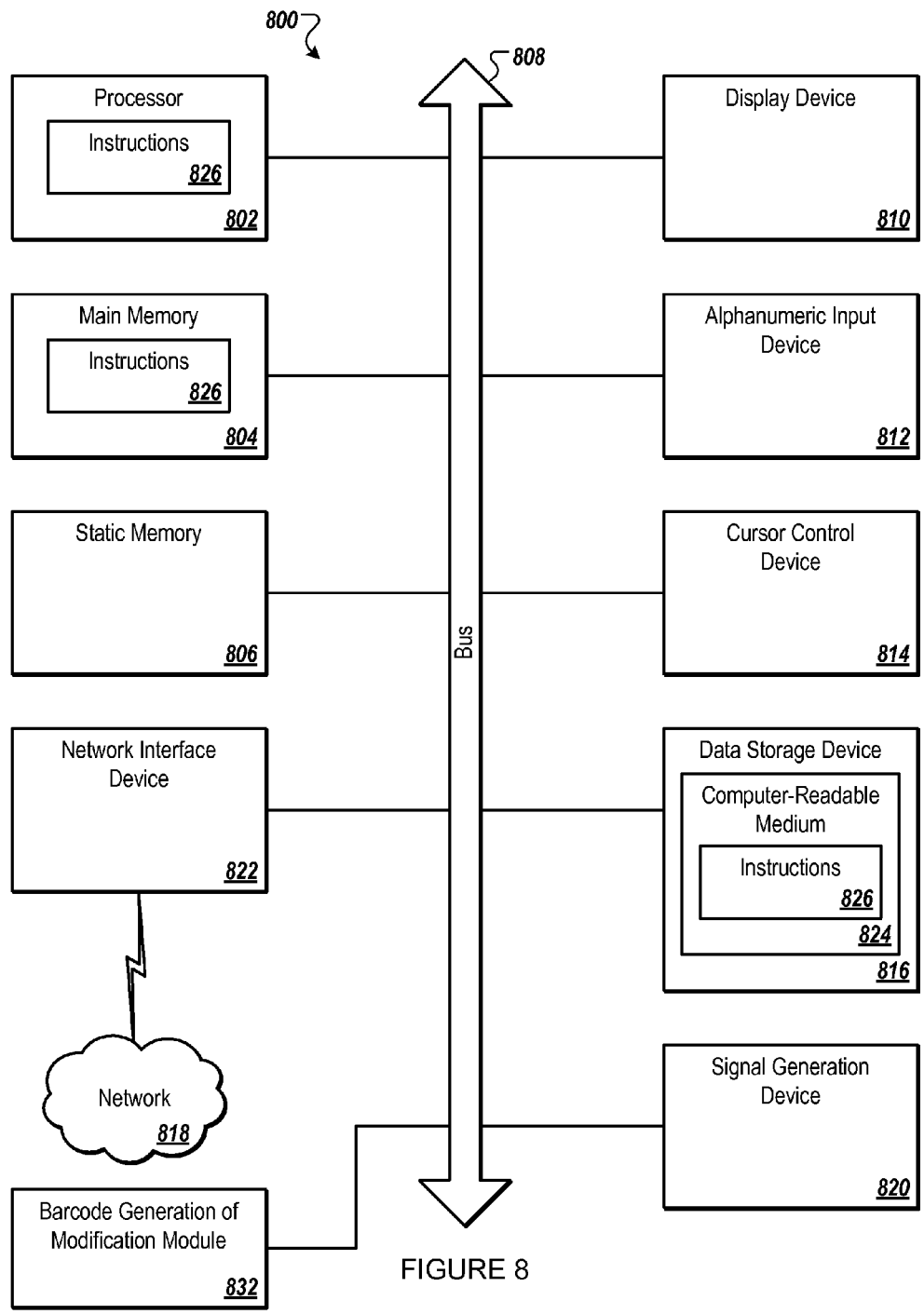
FIG. 8 illustrates a diagrammatic representation of a machine in the example form of a computing system for barcode generation.

FIG. 8 illustrates a diagrammatic representation of a machine in an example form of a computing system 800 for barcode generation and modification. Within the computing system 800 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for barcode generation and modification, such as the methods 200, 300. 400 and 500 described above. In one embodiment, the computing system 800 represents various components that may be implemented in the client computing system 104, 105, 106, 107, the remote computing system 108 or both, as described above. Alternatively, the client computing system 104, 105, 106, 107, or the remote computing system 108 may include more or less components as illustrated in the computing system 800.

The example computing system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, each of which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic (e.g., barcode generation or modification instructions 826) for performing the operations and steps discussed herein.

The computing system 800 may further include a network interface device 822. The computing system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-readable storage medium 424 on which is stored one or more sets of instructions (e.g., barcode generation or modification instructions 826) embodying any one or more of the methodologies or functions described herein. The barcode generation or modification instructions 826 may also reside, completely or at least partially, within the main memory 804 and/or within the processing device 802 during execution thereof by the computing system 800, the main memory 804 and the processing device 802 also constituting computer-readable storage media. The barcode generation 826 may further be transmitted or received over a network via the network interface device 822.

While the computer-readable storage medium 824 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions.

The barcode generation or modification module 832, components, and other features described herein (for example in relation to FIG. 1) can be implemented as discrete hardware components or integrated in the functionality of hardware components such as ASICS, FPGAs, DSPs, or similar devices. The barcode generation or modification module 832 may implement operations of barcode generation or modification as described herein with respect to FIGS. 2-5. In addition, the barcode generation or modification module 832 can be implemented as firmware or functional circuitry within hardware devices. Further, the barcode generation or modification module 832 can be implemented in any combination hardware devices and software components.

In the preceding description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," "detecting," "sending," "receiving," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   identifying, by a code scanner application executing on a computing device, a barcode, wherein the barcode is associated with an item of interest;
   decoding, by the computing device, the barcode to obtain first information regarding the item of interest, wherein the first information is encoded in the barcode or is retrieved from a Uniform Resource Locator (URL) that is encoded in the barcode;
   matching the decoded barcode with a database record;
   presenting, via a graphical interface on the computing device, an input mechanism to receive supplemental information regarding the item of interest that is not encoded in the barcode;
   receiving supplemental information of the item of interest from a source; and
   storing the supplemental information in the database record; and
   encoding the supplemental information in a URL-friendly format such that the encoded supplemental information is added to an existing URL to create a new URL that, when accessed, causes the supplemental information to be presented.

2. The method of claim 1 further comprising presenting, via the graphical interface, the first information and the supplemental information.

3. The method of claim 1, wherein the barcode is generated by a third party.

4. The method of claim 1 further comprising transmitting, over a network, the supplemental information and the database record to a centralized database at a server device.

5. The method of claim 4, wherein the barcode is received at the computing device while the computing device is offline, the method further comprising:
   identifying the database record of the barcode from a local storage, wherein the local storage comprises the first information;
   presenting, via the graphical interface, at least a portion of the first information from the local storage, wherein storing the supplemental information comprises storing the supplemental information in the local storage; and
   synchronizing the supplemental information and the database record in the local storage with the centralized database at the server device when the computing device is online.

6. The method of claim 5, wherein identifying the barcode comprises:
   identifying a unique identifier associated with the item of interest; and
   associating the supplemental information and the first information with the unique identifier.

7. The method of claim 1, wherein the encoded supplemental information is prepended or appended to the existing URL to create the new URL.

8. The method of claim 1, wherein presenting the first information and the supplemental information comprises rendering, by an application, the first information and the supplemental information.

9. The method of claim 8, wherein the rendering of the first information and the supplemental information is based on the new URL.

10. The method of claim 1 further comprising
    detecting a connectivity characteristic of the computing device, wherein presenting the first information and the supplemental information comprises selectively presenting the first information and the supplemental information according to the connectivity characteristic.

11. The method of claim 10, wherein the connectivity characteristic is at least one of: an amount of available bandwidth, an amount of total bandwidth, or a detected network speed.

12. The method of claim 1 further comprising:
    receiving, at the computing device, a request to edit at least a portion of the first information or the supplemental information; and
    modifying, by the computing device, the first information or the supplemental information in the database record.

13. The method of claim 1 wherein the input mechanism comprises a graphical tool to receive at least one of textual data or a file for the supplemental information.

14. The method of claim 1, wherein the supplemental information comprise at least one of: a title text, a setting flag, a group, a file, a photo, a communication, a video, audio, a location, a social component, a comment, or a security setting.

15. The method of claim 1, wherein the supplemental information is received based on the computing device analyzing the first information encoded in the barcode.

16. An apparatus comprising:
    a memory to store instructions;
    a barcode scanning sensor coupled to a processing device, the barcode scanning sensor to receive a barcode and communicate receipt of the barcode to the processing device, wherein the barcode is associated with an item of interest; and
    the processing device coupled to the memory, the processing device to:
       identify the barcode;
       decode the barcode to obtain first information regarding the item of interest, wherein the first information is encoded in the barcode or is retrieved from a Uniform Resource Locator (URL) that is encoded in the barcode;
       match the decoded barcode with a database record;
       present, via a graphical interface, an input mechanism to receive supplemental information regarding the item of interest that is not encoded in the barcode;
       receive supplemental information of the item of interest from a data source; and
       store the supplemental information in the database record; and
       encode the supplemental information in a URL-friendly format such that the encoded supplemental information is added to an existing URL to create a new URL that, when accessed, causes the supplemental information to be presented.

17. A non-transitory computer readable storage medium encoding instructions thereon that, in response to execution by a processing device, cause the processing device to perform operations comprising:
    identifying, by a code scanner application executing on a computing device, a pre-existing barcode, wherein the barcode is associated with an item of interest;
    matching the decoded barcode with a database record, wherein the database record comprises supplemental information regarding the item of interest;
    presenting, via a graphical interface on the computing device, an input mechanism to receive a modification to the supplemental information;
    storing the modification to the supplemental information in the database record; and encode the supplemental information in a URL-friendly format such that the encoded supplemental information is added to an existing URL to create a new URL that, when accessed, causes the supplemental information to be presented.

18. The non-transitory computer readable storage medium of claim 17, wherein the code scanner application is a mobile application.

19. The non-transitory computer readable storage medium of claim 17, the operations further comprising:
   receiving a request to edit at least a portion of the supplemental information; and
   modifying the supplemental information in the database record.

20. The apparatus of claim 16, wherein the barcode is received at the barcode scanning sensor when the processing device is offline, and wherein the processing device is further to:
   identify the database record from a local storage, wherein the supplemental information is stored in the database record in the local storage;
   present, via the graphical interface, at least a portion of the first information from the local storage; and
   synchronize the supplemental information and the database record in the local storage with a centralized database at a server device when the processing device is online.

* * * * *